United States Patent
Wright

(10) Patent No.: US 10,052,981 B2
(45) Date of Patent: Aug. 21, 2018

(54) CONVERTIBLE CAR SEAT TO STROLLER DEVICE

(71) Applicant: Nicole Wright, Laguna Niguel, CA (US)

(72) Inventor: Nicole Wright, Laguna Niguel, CA (US)

( * ) Notice: Subject to any disclaimer, the term of this patent is extended or adjusted under 35 U.S.C. 154(b) by 154 days.

(21) Appl. No.: 15/047,294

(22) Filed: Feb. 18, 2016

(65) Prior Publication Data

US 2017/0240072 A1    Aug. 24, 2017

(51) Int. Cl.
*B60N 2/28* (2006.01)
*B62B 7/12* (2006.01)
*A47C 7/66* (2006.01)

(52) U.S. Cl.
CPC .............. *B60N 2/2848* (2013.01); *A47C 7/66* (2013.01); *B60N 2/2812* (2013.01); *B60N 2/2845* (2013.01); *B62B 7/12* (2013.01)

(58) Field of Classification Search
CPC .. B60N 2/2848; B60N 2/2812; B60N 2/2845; A47C 7/66
USPC ............................................ 297/130, 184.13
See application file for complete search history.

(56) References Cited

U.S. PATENT DOCUMENTS

| | | | |
|---|---|---|---|
| 4,834,403 A | 5/1989 | Yanus et al. | |
| 4,902,026 A * | 2/1990 | Maldonado | B60N 2/2848 297/130 X |
| D310,054 S | 8/1990 | Tucker et al. | |
| 7,464,957 B2 | 12/2008 | Worth et al. | |
| 7,506,921 B1 | 3/2009 | Sigmon, Jr. et al. | |
| 8,011,727 B1 * | 9/2011 | Martinez | B60N 2/2881 297/184.13 X |
| 8,322,744 B2 | 12/2012 | Ahnert et al. | |
| 9,227,536 B1 * | 1/2016 | Cary | |
| 9,260,039 B1 * | 2/2016 | Satterfield | |

* cited by examiner

*Primary Examiner* — Anthony D Barfield

(57) ABSTRACT

A convertible car seat to stroller device includes a car seat that has a frame, which is rigid. A handle, which is extendable, is coupled to the frame. One of pair of cross supports, each comprising a front member and back member, is pivotally coupled to a bottom of the frame proximate to a left side of the frame. The other of the pair of cross supports is pivotally coupled to the bottom proximate to a right side of the frame. A front axle is rotationally couple to the front members. The front axle is coupled to a pair of front wheels. A back axle is rotationally coupled to the back members. The back axle is coupled to a pair of back wheels. The car seat is couplable to a base, which is couplable to the interior of a vehicle.

18 Claims, 5 Drawing Sheets

CONVERTIBLE CAR SEAT TO STROLLER DEVICE

BACKGROUND OF THE DISCLOSURE

Field of the Disclosure

The disclosure relates to stroller devices and more particularly pertains to a new car seat device that is convertible to a stroller.

SUMMARY OF THE DISCLOSURE

An embodiment of the disclosure meets the needs presented above by generally comprising a car seat that has a frame, which is rigid. A handle, which is extendable, is coupled to the frame. One of pair of cross supports, each comprising a front member and back member, is pivotally coupled to a bottom of the frame proximate to a left side of the frame. The other of the pair of cross supports is pivotally coupled to the bottom proximate to a right side of the frame. A front axle is rotationally couple to the front members. The front axle is coupled to a pair of front wheels. A back axle is rotationally coupled to the back members. The back axle is coupled to a pair of back wheels. The car seat is couplable to a base, which is couplable to the interior of a vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
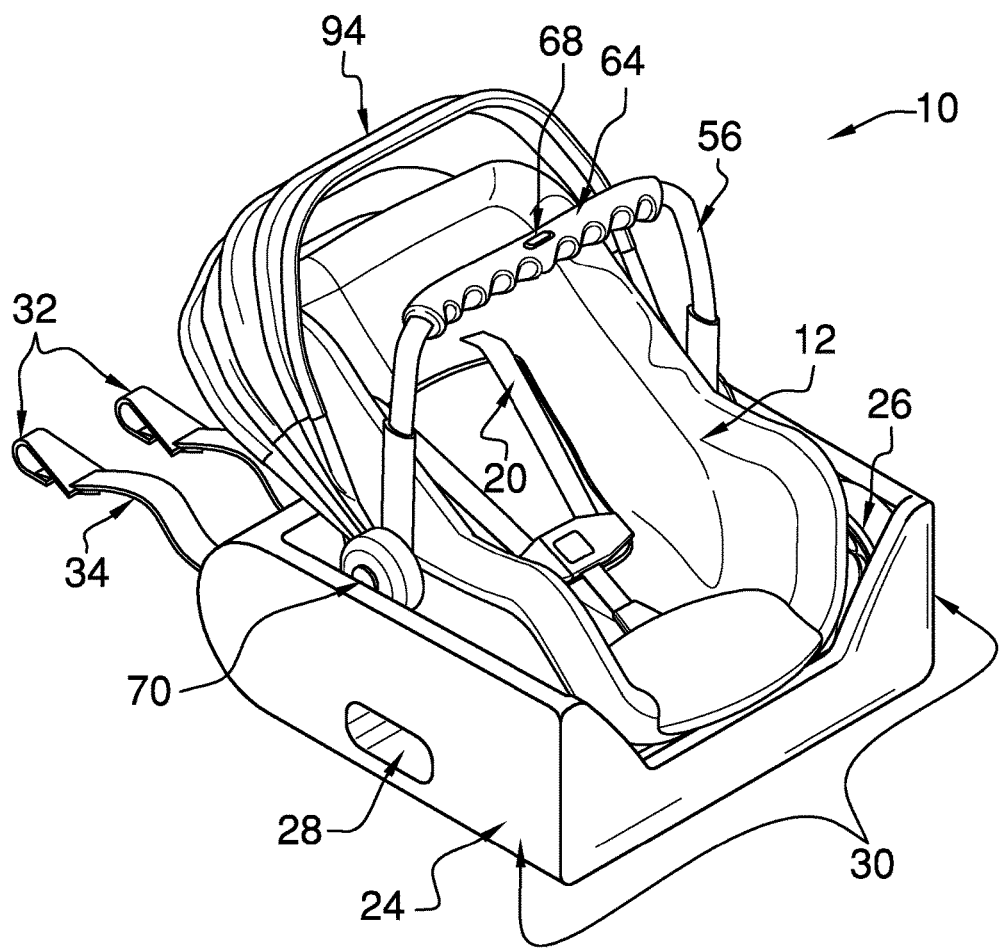
FIG. 1 is an isometric perspective view of a convertible car seat to stroller device according to an embodiment of the disclosure.
Figure 2:
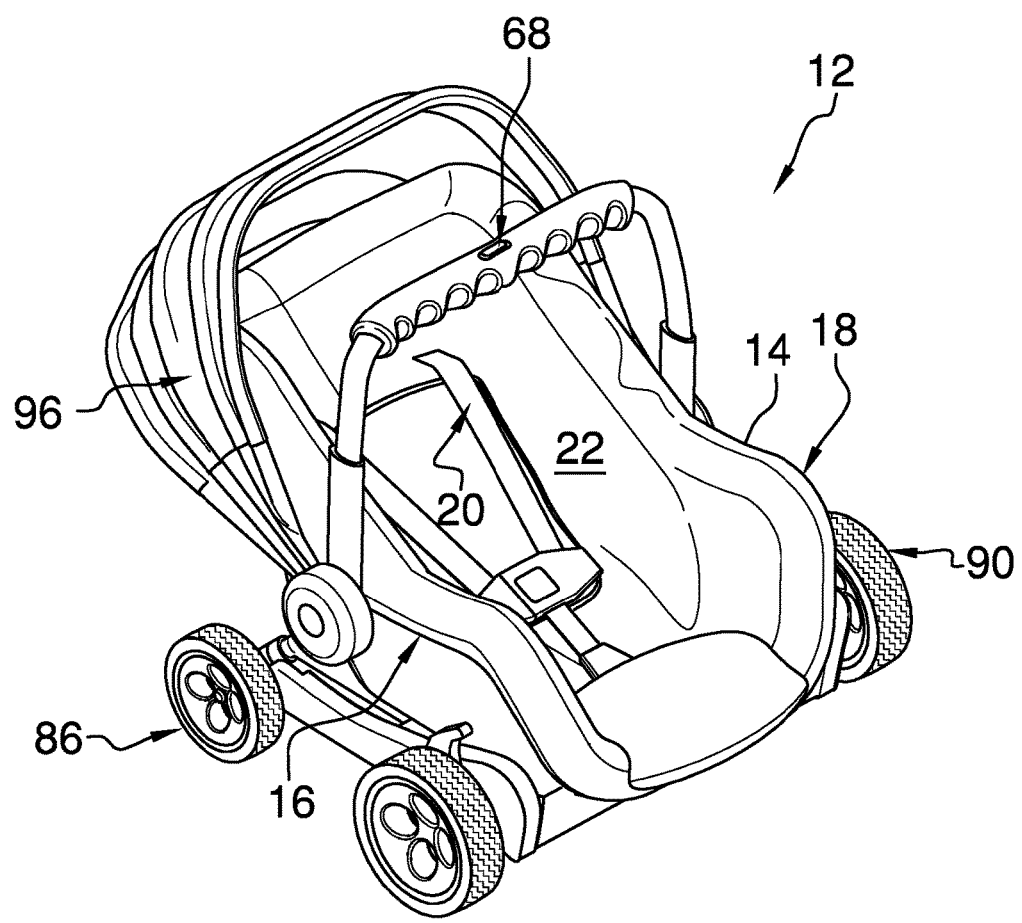
FIG. 2 is an isometric perspective view of an embodiment of the disclosure.
Figure 3:
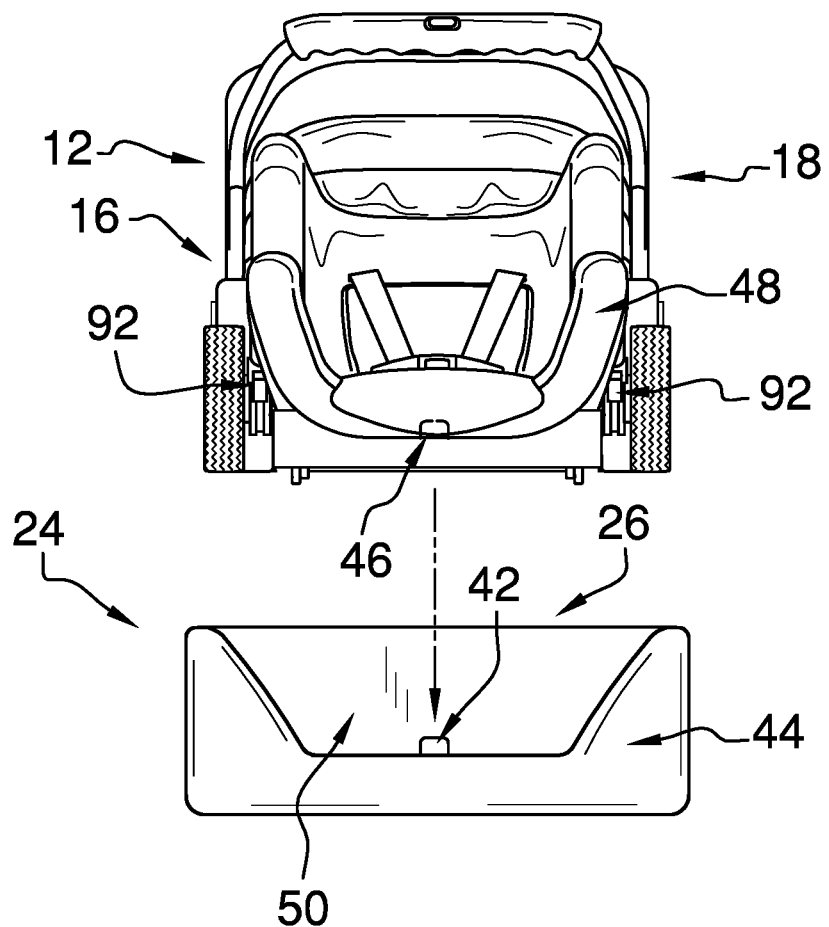
FIG. 3 is a back view of an embodiment of the disclosure.
Figure 4:
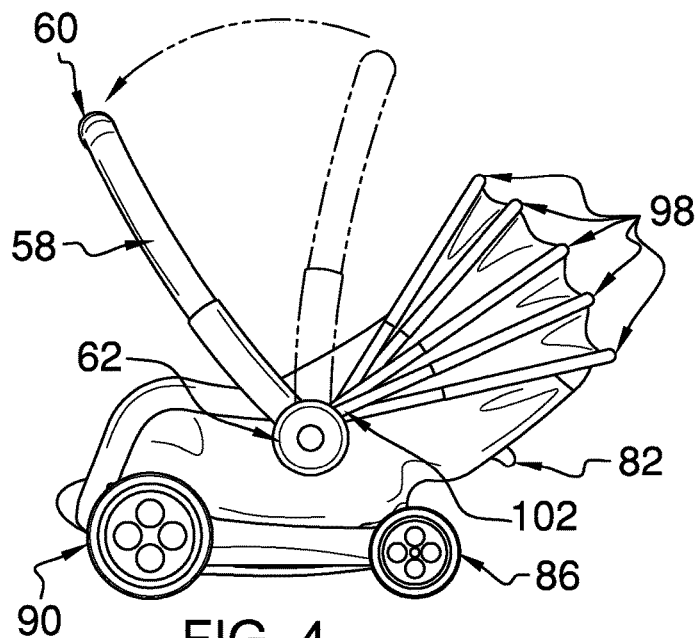
FIG. 4 is a right side view of an embodiment of the disclosure.
Figure 5:
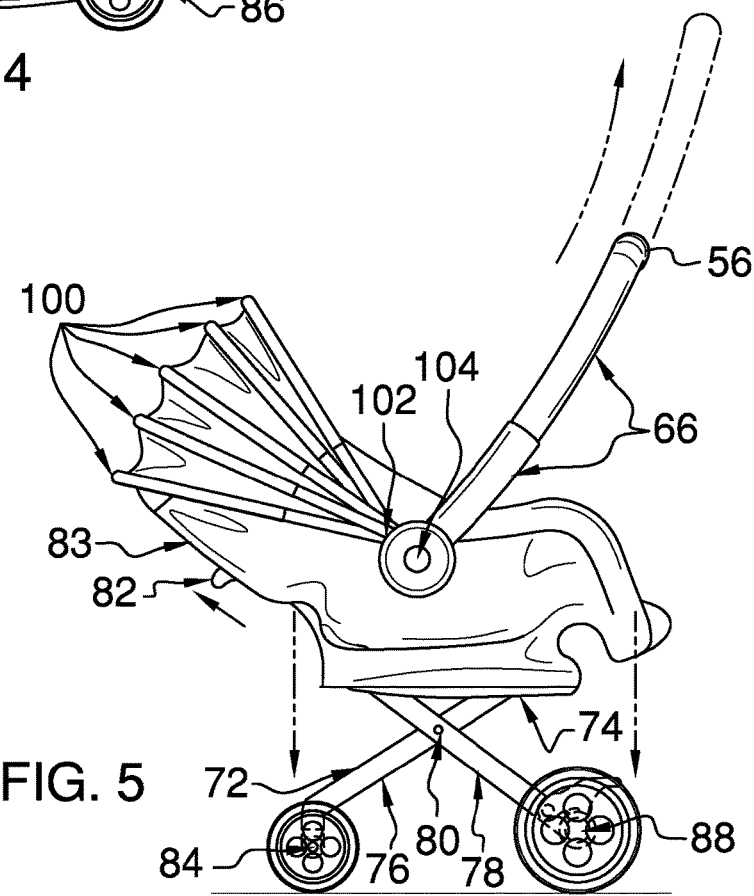
FIG. 5 is left side view of an embodiment of the disclosure.
Figure 6:
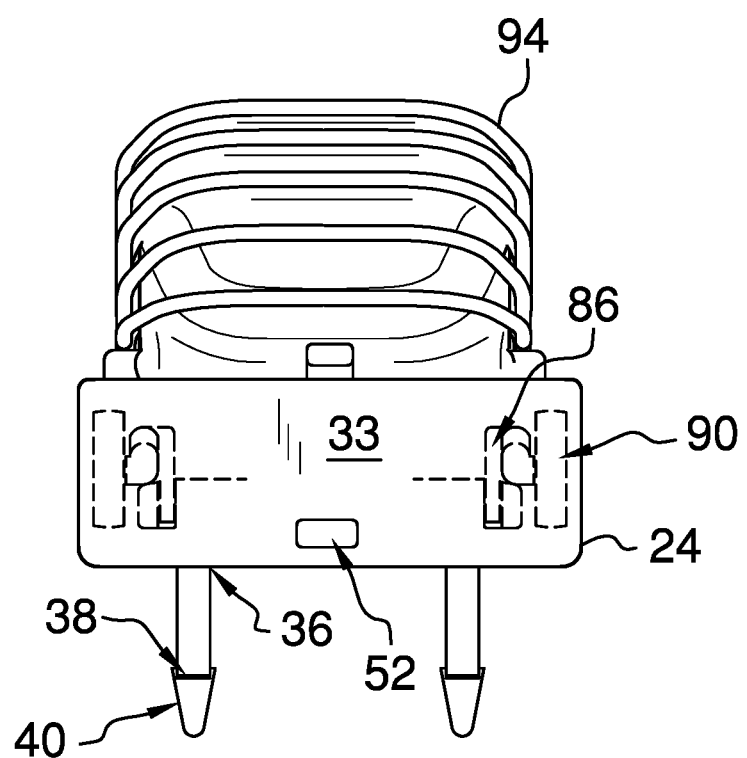
FIG. 6 is front view of an embodiment of the disclosure.

With reference now to the drawings, and in particular to FIGS. 1 through 6 thereof, a new stroller device embodying the principles and concepts of an embodiment of the disclosure and generally designated by the reference numeral 10 will be described.

As best illustrated in FIGS. 1 through 6, the convertible car seat to stroller device 10 generally comprises a car seat 12 that has a frame 14. The frame 14 is rigid and has a left side 16 and a right side 18. The car seat 12 is shaped and sized to fit a child. A harness 20 is coupled to the frame 14, such that a child can be secured to the frame 14. A cushion 22 is coupled to the frame 14.

The car seat 12 is couplable to a base 24. The base 24 is couplable to the interior of a vehicle and positioned to secure the car seat 12 in the vehicle. The base 24 is elongated box shaped with an open top 26 configured to receive the car seat 12. A slot 28 extends between opposing sides 30 of the base 24. The slot 28 is configured to receive a seat belt to attach the base 24 to a vehicle. A pair of fasteners 32 is coupled to a front side 33 of the base 24. The fasteners 32 are configured to secure the base 24 to the seat of a vehicle. The fasteners 32 comprise straps 34. Each strap 34 has a first terminus 36 coupled to the base 24 and a second terminus 38 coupled to a grasp 40. A latch 42 is coupled to the base 24. The latch 42 is positioned on a back side 44 of the base 24. The latch 42 is complimentary to a latch receptacle 46 positioned in a back 48 of the frame 14. The latch 42 of the base 24 is positioned to engage the latch receptacle 46 of the car seat 12 to secure the car seat 12 to the base 24.

The back side 44 of the base 24 is lower than the opposing sides 30, defining a leg overhang 50 in the base 24. A latch release 52 is positioned on the front side 33 of the base 24. The latch release 52 is operationally coupled to the latch 42, such that the latch release 52 is configured to be depressed by the user to disengage the car seat 12 from the base 24. The opposing sides 30 are rounded adjacent to the front side 33 of the base 24.

A handle 56 is coupled to the frame 14. The handle 56 is extendable and comprises a pair of tubes 58. Each tube 58 has a top end 60 and a bottom end 62. Each bottom end 62 is pivotally coupled respectively to the left side 16 and the right side 18 of the frame 14. A bar 64 is coupled to and extends between the top ends 60 of the tubes 58. The tubes 58 comprise pluralities of nested sections 66, such that the tubes 58 are telescopic and the handle 56 both rotatable and extendable. Preferably, each of the pluralities of nested sections 66 comprises two sections. A handle release 68 is positioned in the bar 64 and operationally coupled to the pluralities of nested sections 66. The handle release 68 is configured to be depressed by the user to extend the handle 56. A pivot release 70 is operationally coupled to the handle 56 at a respective bottom end 62. The pivot release 70 is configured to be depressed by the user, in order to reposition the handle 56, and released to lock the handle 56 in a desired configuration relative to the frame 14. Preferably, the pivot release 70 is positioned on the left side 16 of the frame 14.

One of a pair of cross supports 72 is pivotally coupled to a bottom 74 of the frame 14 proximate to the left side 16 of the frame 14. The other of the pair of cross supports 72 is pivotally coupled to the bottom 74 proximate to the right side 18. Each cross support 72 comprises a front member 76 and a back member 78 rotationally coupled proximate to a mutual center point 80. The pair of cross supports 72 is extendable and X-shaped beneath the frame 14. An actuator 82 is positioned in the frame 14 and is operationally coupled to the pair of cross supports 72. Preferably, the actuator 82 is positioned on a front 83 of the frame 14. The actuator 82 releases the pair of cross supports 72 from a stowed position, locks the pair of cross supports 72 in an extended X-shaped configuration beneath the frame 14, and releases the pair of cross supports 72 for repositioning to a stowed position.

A front axle 84 is rotationally coupled to the front members 76. The front axle 84 is coupled to a pair of front wheels 86. Preferably, the front wheels 86 are pivotally coupled to the front axle 84, such that the front wheels 86 are turnable. A back axle 88 is rotationally coupled to the back members 78. The back axle 88 is coupled to a pair of back wheels 90. Each of a pair of wheel locks 92 is coupled respectively to the left side 16 and the right side 18 of the frame 14 proximate to the front axle 84. The wheel locks 92 are positioned to engage the front axle 84, such that the pair of front wheels 86 is lockable. Preferably, the back wheels 90 are circumferentially larger than the front wheels 86.

A canopy 94, which is retractable, is coupled to the frame 14. The canopy 94 comprises a covering 96 that has a plurality of sleeves 98. The canopy 94 also comprises a plurality of rods 100, which are curved. One of each of the plurality of rods 100 is positioned in a respective one of the sleeves 98. The rods 100 have opposing ends 102 pivotally coupled to respective pivot points 104 positioned on the left side 16 and the right side 18 of the frame 14. Preferably, the bottom ends 62 of the tubes 58 of the handle 56 also are coupled to the pivot points 104.

In use, the device 10 can be configured for stroller use or stowed for car seat use. The base 24 is secured to the vehicle by inserting the vehicle's seat belt through the slot 28 and by coupling the fasteners 32 to the seat of the vehicle. The latch release 52 disengages the car seat 12 from base. The pivot release 70 positions and locks the handle 56, which is both rotatable and extendable, in a desired configuration relative to the frame 14. The actuator 82 releases the pair of cross supports 72 from a stowed position and locks the pair of cross supports 72 in an extended position beneath the frame 14. The device 10 is thus configured for stroller use. The pair of wheel locks 92 can be engaged to prevent rotation of the front axle 84 and movement of the stroller. When required and engaged, the actuator 82 releases the pair of cross supports 72 for repositioning to a stowed position. The frame 14 is reversibly couplable to the base 24 by means of the latch 42 and latch receptacle 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A convertible car seat to stroller device, said device comprising:
   a car seat, said car seat having a frame, said frame being rigid, said frame having a left side and a right side;
   a handle, said handle being coupled to said frame, said handle being extendable;
   a pair of cross supports, one of said pair of cross supports being pivotally coupled to a bottom of said frame proximate to a said left side, the other of said pair of cross supports being pivotally coupled to said bottom proximate to said right side, each said cross support comprising a front member and a back member rotationally coupled proximate to a mutual center point;
   a front axle, said front axle being rotationally couple to said front members, said front axle being coupled to a pair of front wheels;
   a back axle, said back axle being rotationally coupled to said back members, said back axle being coupled to a pair of back wheels; and
   a base, said car seat being couplable to said base, wherein said base is couplable to the interior of a vehicle and positioned to secure said car seat in the vehicle, a back side of said base being lower than opposing sides of said base defining a leg overhang in said base.

2. The device of claim 1, further including said car seat comprising:
   a harness, said harness being coupled to said frame, wherein a child can be secured to said frame;
   a cushion, said cushion being coupled to said frame; and
   said car seat being shaped and sized for a child.

3. The device of claim 1, further including said handle comprising:
   a pair of tubes, each said tube having a top end and a bottom end, each said bottom end being pivotally coupled respectively to said left side and said right side of said frame; and
   a bar, said bar being coupled to and extending between said top ends of said tubes.

4. The device of claim 3, further including said tubes comprising pluralities of nested sections, wherein said tubes are telescopic and said handle both rotatable and extendable.

5. The device of claim 4, further including each of said pluralities of nested sections comprising two sections.

6. The device of claim 3, further including a pivot release, said pivot release being operationally coupled to said handle at a respective said bottom end, wherein said pivot release is configured to be depressed by the user in order to reposition said handle and released to lock said handle in a desired configuration relative to said frame.

7. The device of claim 6, further including said pivot release being positioned on said left side of said frame.

8. The device of claim 1, further including each said front member being rotationally coupled to a respective said back member proximate to a mutual center point.

9. The device of claim 1, further including an actuator, said actuator being positioned in said frame, said actuator being operationally coupled to said pair of cross supports, wherein said actuator releases said pair of cross supports from a stowed position, locks said pair of cross supports in an extended position beneath said frame, and releases said pair of cross supports for repositioning to a stowed position.

10. The device of claim 9, further including said actuator being positioned on said back of said frame.

11. The device of claim 1, further including said front wheels being pivotally coupled to said front axle, wherein said front wheels are turnable.

12. The device of claim 1, further including a canopy, said canopy being coupled to said frame, said canopy being retractable.

13. The device of claim 12, further including said canopy comprising:
   a covering, said covering having a plurality of sleeves;
   a plurality of rods, said rods being curved, one of each said plurality of rods being positioned in a respective one of said sleeves, said rods having opposing ends, said opposing ends being pivotally coupled to respective pivot points positioned on said left side and said right side of said frame.

14. The device of claim 13, further including each of said bottom ends of said tubes of said handle being coupled to said pivot points.

15. The device of claim 1, further including said base comprising:
   said base being elongated box shaped, said base having an open top, said open top being configured to receive said car seat;
   a slot, said slot extending between said opposing sides of said base, said slot being configured to receive a seat belt to attach said base to a vehicle;
   a pair of fasteners, said fasteners being coupled to a front side of said base, said fasteners being configured to secure said base to the seat of a vehicle;
   a latch, said latch being coupled to said base, said latch being positioned on said back side of said base, said latch being complimentary to a latch receptacle positioned in a back of said frame; and
   wherein said latch of said base is positioned to engage said latch receptacle of said car seat to secure said car seat to said base.

16. The device of claim 15, further including said fasteners comprising straps, each strap having a first terminus coupled to said base and a second terminus coupled to a grasp.

17. The device of claim 1, further including a pair of wheel locks, each said wheel lock being coupled respectively to said left side and said right side of said frame proximate to said front axle, said wheel locks being positioned to engage said front axle, such that said pair of front wheels are lockable.

18. A convertible car seat to stroller device, said device comprising:
   a car seat, said car seat having a frame, said frame being rigid, said frame having a left side and a right side, said car seat being shaped and sized for a child;
   a harness, said harness being coupled to said frame, wherein a child can be secured to said frame;
   a cushion, said cushion being coupled to said frame;
   a base, said car seat being couplable to said base, wherein said base is couplable to the interior of a vehicle and positioned to secure said car seat in the vehicle, said base being elongated box shaped, said base having an open top; said open top being configured to receive said car seat;
   a slot, said slot extending between opposing sides of said base, said slot being configured to receive a seat belt to attach said base to a vehicle;
   a pair of fasteners, said fasteners being coupled to a front side of said base, said fasteners being configured to secure said base to the seat of a vehicle, said fasteners comprising straps, each strap having a first terminus coupled to said base and a second terminus coupled to a grasp;
   a latch, said latch being coupled to said base, said latch being positioned on a back side of said base, said latch being complimentary to a latch receptacle positioned in a back of said frame, wherein said latch of said base is positioned to engage said latch receptacle of said car seat to secure said car seat to said base;
   said back side of said base being lower than said opposing sides, defining a leg overhang in said base;
   a latch release, said latch release being positioned on said front side of said base, said latch release being operationally coupled to said latch, wherein said latch release is configured to be depressed by the user to disengage said car seat from said base;
   said opposing sides being rounded adjacent to said front side of said base;
   a handle, said handle being coupled to said frame, said handle being extendable, said handle comprising a pair of tubes, each said tube having a top end and a bottom end, each said bottom end being pivotally coupled respectively to said left side and said right side of said frame;
   a bar, said bar being coupled to and extending between said top ends of said tubes;
   said tubes comprising pluralities of nested sections, wherein said tubes are telescopic and said handle both rotatable and extendable;
   each of said pluralities of nested sections comprising two sections;
   a handle release, said handle release being positioned in said bar and operationally coupled to said pluralities of nested sections, such that said handle release is configured to be depressed by the user to extend said handle;
   a pivot release, said pivot release being operationally coupled to said handle at a respective said bottom end, wherein said pivot release is configured to be depressed by the user in order to reposition said handle and released to lock said handle in a desired configuration relative to said frame, said pivot release being positioned on said left side of said frame;
   a pair of cross supports, one of said pair of cross supports being pivotally coupled to a bottom of said frame proximate to a said left side, the other of said pair of cross supports being pivotally coupled to said bottom proximate to said right side, each said cross support comprising a front member and a back member rotationally coupled proximate to a mutual center point, wherein said pair of cross supports are extendable and X-shaped beneath said frame;
   an actuator, said actuator being positioned in said frame, said actuator being operationally coupled to said pair of cross supports, said actuator being positioned on said front of said frame, wherein said actuator releases said pair of cross supports from a stowed position, locks said pair of cross supports in an extended X-shaped configuration beneath said frame, and releases said pair of cross supports for repositioning to a stowed position;
   a front axle, said front axle being rotationally coupled to said front members, said front axle being coupled to a pair of front wheels, said front wheels being pivotally coupled to said front axle, wherein said front wheels are turnable;
   a back axle, said back axle being rotationally coupled to said back members, said back axle being coupled to a pair of back wheels;
   a pair of wheel locks, each said wheel lock being coupled respectively to said left side and said right side of said frame proximate to said front axle, said wheel locks being positioned to engage said front axle, such that said pair of front wheels are lockable;
   said back wheels being circumferentially larger than said front wheels; and
   a canopy, said canopy being coupled to said frame, said canopy being retractable, said canopy comprising:
      a covering, said covering having a plurality of sleeves;
      a plurality of rods, said rods being curved, one of each said plurality of rods being positioned in a respective one of said sleeves, said rods having opposing ends, said opposing ends being pivotally coupled to respective pivot points positioned on said left side and said right side of said frame, said bottom ends of said tubes of said handle being coupled to said pivot points.

\* \* \* \* \*